(12) United States Patent
Kumar et al.

(10) Patent No.: US 9,421,709 B2
(45) Date of Patent: Aug. 23, 2016

(54) METHOD OF MANUFACTURING PRODUCT FILLED CONTAINERS

(71) Applicant: Discma AG, Hunenberg (CH)

(72) Inventors: Pankaj Kumar, Dexter, MI (US); Semen Kharchenko, Ann Arbor, MI (US); Darrell Lee, Dundee, MI (US); Frederick C. Beuerle, Jackson, MI (US)

(73) Assignee: DISCMA AG, Hunenberg (CH)

( * ) Notice: Subject to any disclaimer, the term of this patent is extended or adjusted under 35 U.S.C. 154(b) by 114 days.

(21) Appl. No.: 14/215,874

(22) Filed: Mar. 17, 2014

(65) Prior Publication Data

US 2014/0265054 A1    Sep. 18, 2014

Related U.S. Application Data

(60) Provisional application No. 61/794,775, filed on Mar. 15, 2013.

(51) Int. Cl.
| | |
|---|---|
| *B29C 49/46* | (2006.01) |
| *B29C 49/42* | (2006.01) |
| *B29L 31/00* | (2006.01) |
| *B29C 49/06* | (2006.01) |
| *B29C 49/64* | (2006.01) |
| *B65B 3/02* | (2006.01) |

(52) U.S. Cl.
CPC .............. *B29C 49/46* (2013.01); *B29C 49/4273* (2013.01); *B29C 49/06* (2013.01); *B29C 49/64* (2013.01); *B29C 49/6409* (2013.01); *B29C 49/649* (2013.01); *B29C 2049/4652* (2013.01); *B29C 2049/4655* (2013.01); *B29C 2049/4664* (2013.01); *B29L 2031/7158* (2013.01); *B65B 3/022* (2013.01)

(58) Field of Classification Search
None
See application file for complete search history.

(56) References Cited

U.S. PATENT DOCUMENTS

| | | | | |
|---|---|---|---|---|
| 4,610,366 | A | * | 9/1986 | Estes .................... B65D 1/0215 206/524.2 |
| 4,950,153 | A | * | 8/1990 | Dundas ................... B29C 49/64 264/525 |
| 6,920,992 | B2 | | 7/2005 | Lane et al. |
| 7,744,365 | B2 | * | 6/2010 | Maddox .................. B29C 49/42 425/522 |

(Continued)

FOREIGN PATENT DOCUMENTS

| | | |
|---|---|---|
| EP | 2 065 164 A1 | 6/2009 |
| GB | 1 474 044 A | 5/1977 |

(Continued)

OTHER PUBLICATIONS

European Patent Office, European Search Report for European Patent Application No. EP 13 18 3223, Completed by Tomas Ingelgärd on Oct. 24, 2013, Munich, Germany, 3 pages.

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

A method for forming a plastic container in which a heated end product is introduced into a heated preform to expand the preform into at least partial conform with the cavity surfaces of a mold, thereby forming a resultant container, of a first size, with a heated end product. The resultant container is then capped and shrunk to a second size, which is less than the first size. The shrinkage of the reluctant container is greater than the shrinkage of the end product thereby creating a positive pressure within the capped container.

19 Claims, 1 Drawing Sheet

(56) References Cited

U.S. PATENT DOCUMENTS

| | | | |
|---|---|---|---|
| 7,914,726 B2* | 3/2011 | Andison | B29C 49/46 264/523 |
| 2010/0206876 A1 | 8/2010 | Outreman | |
| 2012/0207872 A1 | 8/2012 | Lisch et al. | |
| 2012/0266567 A1* | 10/2012 | Haesendonckx | B65B 3/022 53/456 |
| 2012/0311966 A1 | 12/2012 | Melrose | |

FOREIGN PATENT DOCUMENTS

| | | |
|---|---|---|
| WO | 2012/010461 A1 | 1/2012 |
| WO | 2013/092146 A1 | 6/2013 |
| WO | 2013/117492 A1 | 8/2013 |

* cited by examiner

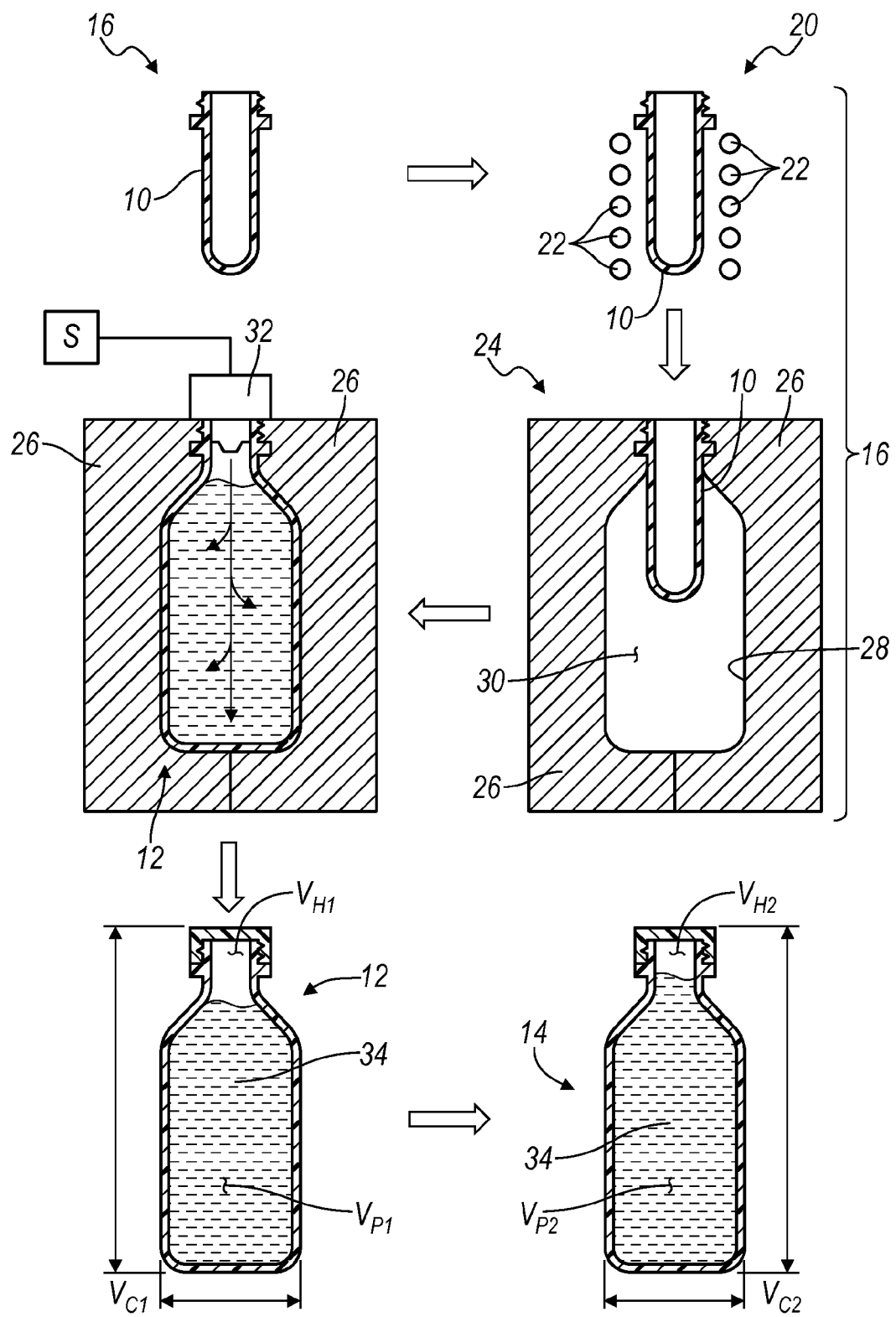

METHOD OF MANUFACTURING PRODUCT FILLED CONTAINERS

CROSS REFERENCE TO RELATED APPLICATION

This application claims the benefit of U.S. provisional patent application No. 61/794,775, filed on Mar. 15, 2013, the entire contents of which is herein incorporated by reference.

BACKGROUND

1. Field of the Invention

The present the invention relates to the molding of containers for liquid and viscous products.

2. Description of Related Art

Plastic containers are commonly used for the packaging of various products, including liquid products and viscous products. One of the most common forms of plastic container is the blow molded plastic container, which are often formed of polyester materials and, more specifically, of polyethylene terephthalate (PET). Blow molded plastic containers are generally formed by placing a heated preform into a blow mold and then inflating the preform with air until the preform contacts the interior surfaces of the mold cavity, which define the final shape of the desired container. Once the inflated preform has been positively held against the interior surfaces of the mold cavity for a length of time sufficient to "freeze" the plastic, the molded container is removed from the mold.

Molded containers are then transported to a location where the container will be filled with the intended product and labeled. This post-molding process may include the packaging and shipping of the container to a different physical location or may involve the transferring of the container to another location in the manufacturing facility where these final steps are performed.

In an effort to reduce costs and decrease materials ultimately entering into landfills, the amount of material in these containers has been reduced. As a consequence, the containers are less strong, and such non-carbonated containers can experience a collapsing of the container's sidewall when stacked because of the top-load applied thereto.

One method to increase the top-load strength of a container is to dose the container with nitrogen immediately prior to final sealing and capping of the container. By introducing nitrogen into the headspace of the container, the content volume and internal pressure of the container is increased. The increased pressure displaces the liquid located below the headspace, which in turn results in an increase in the top-load strength of the container.

Nitrogen dosing, however, is costly and therefore can negatively affect the economics of the category of the product in the container. For example, bottled water has lower profit margins than other bottled liquids, but water containers are one of the containers most impacted by light weighting due to the sheer number of water bottles that enter the product stream. Nitrogen dosing reduces that margin even further.

A newer process for forming containers involves the use of the end product itself as the medium for molding the container. During this process, the container is simultaneously molded by and filled with the end product. As used herein, this molding technique is referred to as hydraulic molding.

SUMMARY

In view of the above, the present invention provides a method for forming a plastic container in which there is a positive pressure within the container after the end product and container have been capped and cooled. According to the method, a plastic preform is heated and positioned within a mold having cavity surfaces defining a cavity shape generally corresponding to a desired shape of the container. The end product is heated to an elevated temperature above ambient temperature and injected into the heated preform. The injected end product at least partially causes the heated preformed to expand into contact with the cavity surfaces and to conform to the shape of the cavity, thereby forming a filled resultant container of a first size. The filled resultant container is capped, while generally at the first size, and thereafter shrunk to a second size, the second size being smaller than the first size.

The shrinkage of the container and the shrinkage end product occur at different rates, with the shrinking of the end product being less than the shrinking of the container, thereby resulting in the final container having a positive internal pressure exhibiting good top load handling characteristics.

BRIEF DESCRIPTION OF THE DRAWINGS

FIG. 1 is diagrammatic illustration of a process, embodying the principles of the present invention, for forming a container filled with its end product.

DETAILED DESCRIPTION

Referring now to the drawing, a process for forming a container filled with an end product in accordance with the principles of the present invention is illustrated therein. The process in accordance with the present invention involves the forming of a plastic container utilizing the end product as the medium that expands a heated preform within a mold cavity until the preform has been expanded into conformity with the surfaces of the mold cavity thereby defining a resultant container. As seen in the drawing, the preform is designated at 10; the resultant container designated at 12 and the final container designated at 14.

Generally, preforms 10 are provided to a molding system 16 at an in-feed station 18 by way of a rail or other transport mechanism (not shown). The preforms 10 are then individually placed onto a conveyor that transports the preforms 10 through a heating oven 20.

The oven 20 will typically include a plurality of heaters 22 spaced along the length of the oven 20. The oven 20 itself may include two or more sub-zones, the purpose of which is to introduce a temperature profile into the preform 10 to facilitate the desired molding of the resultant container 12. Such sub-zones may include a pre-heating zone, a main heating zone and a finishing heating zone. They may also include a greater or lesser number of sub-zones as well as other types of sub-zones. In the oven, the heaters 22 may be spaced not only along the length of the oven 20, but also longitudinally relative to the length of the preforms 10. In this manner, heaters 22 of different intensities may be utilized to define a temperature gradient over the length and or thickness of the preforms 10. The actual heat profile employed will depend on the specific design of the preform 10, including its shape and material composition, as well as the specific design of the final container 14. From the heating oven 20, the heated preforms are loaded into a mold assembly 24, which may be one of many mold assemblies 24 and a molding machine 25.

The mold assembly 24 is typically comprised of two mold halves 26 that include interior surfaces 28 which cooperatively define a mold cavity 30 in the shape of the resultant container 12. Once positioned within the mold cavity 30, a nozzle 32 engages the finish of the preform 10 and/or portions of the mold assembly 24 and injects a heated end product 34 into the preform 10. As used herein, the term end product 34 is intended to mean the product ultimately retained in the final container 14 and which is intended to be sold to the purchasing consumer. Accordingly, the end product 34 may be a beverage such as water, a sports/electrolyte replenishment drink, juice or another beverage, or the end product may be a viscous food product such as a condiment or applesauce. Obviously, the above examples of end products 34 are not intended to be an exhaustive list of the possible end products 34 with which the present invention may be employed, but rather are merely presented for illustrative purposes.

The end product 34 is provided from a source 36 where the end product 34 may be heated and stored under pressure. Alternatively, the end product 34 may be heated and pressurized after being withdrawn from the source 36 and en route to the nozzle 32.

The method by which the final container 14 is directly formed and filled with the end product 34 is a one step, integrated process. By heating the preform 10 to a high temperature (about 90° to 150° C.), heating the mold halves (to about 70° to 300° F.) and by utilizing a heated (warm or hot) end product (about 50° to 205° F.) to simultaneously form and fill the resultant container 12, a process has been developed where the resultant container 12 can be induced to shrink a desired amount after its initial formation. This process therefore results in the ability to create a positive pressure within the final container 14, such as a water filled container, without utilizing nitrogen dosing. The process also results in the ability to control or mitigate the amount of vacuum formed within the final container 14, such as the vacuum formed within a hot-fill container. Generally, the above is believed to be achieved as a result of the temperature of the side walls of the resultant container 12 and their controlled cooling via the latent heat of the heated end product 34. While not completely understood at this time, the temperature of the side walls of the resultant container 12 and the controlled cooling via the latent heat of the end product 34 are believed to induce low crystallinity in the plastic material forming the resultant container 12 (a crystallinity of less than 25%), which in turn allows for post-forming shrinkage of the resultant container 12 and a reduction in the internal volume of the final container 14 relative to the resultant container 12. Volume reductions of the resultant container 12 to the final container 14 may be achieved within the range of 0.05% to 4%.

As seen in the figure, after simultaneous molding/filling of the resultant container 12, the resultant container is capped and sealed. Thereafter, the capped resultant container 12 undergoes controlled cooling to produce the final container 14 with the end product 34 located therein. By controlling the temperature of the mold halves 26, the temperature of the preform 10 and the temperature of the end product 34 during forming of the resultant container 12, the resulting crystallinity of the plastic forming the resultant container 12 can be controlled. Thereafter, by controlling the ambient temperature about the capped resultant container 12, the rate at which the capped resultant container 12 cools can also be controlled. Controlling the crystallinity of the resultant container 12 and the rate at which the resultant container 12 cools results in the ability to control the shrinkage experienced by the resultant container. Additionally, by controlling the initial amount end product 34 retained within the capped resultant container 12, the final volumes of the end product 34 and the final container 14 can be tuned to one another to achieve a specific result for a specific end product 34, which may be different depending on the specific end product 34.

For example, if the end product 34 is water, prior water filling temperatures of about 50° to 70° F. are used with an already formed container held at ambient or room temperature. No shrinkage of the container occurs and often nitrogen dosing is utilized to increase the top load strength of the container, particularly when the container is designed as a lightweight container. With the present invention, water is heated to a temperature in the range of 70° to 120° F. and utilized in molding the heated preform (heated to about 90° to 150° C.) within optionally heated molds (70° to 300° F.) and filling the resultant container 12. This produces crystallinity in the resulting container that is less than 25%. Upon cooling, the resultant container 12 shrinks and its internal volume decreases. The volume of the water retained within the capped resultant container 12 will shrink less than the resultant container 12 itself. This is also true of the volume of air in the headspace of the capped resultant container 12. By controlling the ratios of the respective volume decreases of these components (keeping the volume decrease of the headspace plus the volume decrease of the water as less than the volume decrease of the resultant container 12), one can achieve a positive pressure within the final container 14. This positive pressure allows the bottler to provide a lightweight final container 12 with better top-load strength in a neutral pressure container without having to resort to nitrogen dosing.

When the end product is a hot-fill product, such as a fruit juice, the normal filling temperature of the end product into the already formed container may be as high as 205° F. Because of this high temperature, once the container is capped and the end product cools, the volume of the end product is significantly reduced, but the volume of the container is not. This results in a vacuum being formed within the container. To accommodate this formation of vacuum without subjecting the container to undesirable deformation, various physical structures must be provided in the container.

With the present invention, tuning the shrinkage of the resultant container 12 with the shrinkage of the hot-filled end product 34 allows for the significant reduction in volume of the hot-filled end product 34 to be offset by the shrinkage and volume reduction of the resultant container 12 during cooling. As a result, the formation of vacuum within the capped final container 14 may be mitigated or controlled such that the final container 14 need not employ physical structures, such as vacuum panels, to handle otherwise high vacuum formation.

The end result of the inducement of positive pressure and the mitigation of vacuum formation within the final container 14 is that the process enables a wider range of resin types, preform design and container design than is possible by current techniques.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

We claim:
1. A method for forming a plastic container, the method comprising the steps of: providing a plastic preform;
   heating the preform;
   locating the preform within a mold, the mold having cavity surfaces defining a cavity shape generally corresponding to a desired shape of the container;
   heating an end product to an elevated temperature, the elevated temperature being above ambient temperature;

introducing the heated end product into the heated preform to at least partially cause the heated preformed to expand into contact with the cavity surfaces and to conform with the shape of the cavity, thereby forming a resultant container filled with the heated end product, the resultant container having a first size;

removing the resultant container filled with the heated end product from within the mold;

capping the resultant container with the heated end product therein to form a capped container;

shrinking the capped container to a second size, the second size being smaller than the first size, including the step of modulating the shrinkage of the container with latent heat of the heated end product.

2. The method of forming a plastic container according to claim 1, further comprising the step of creating a positive pressure within the capped container.

3. The method of forming a plastic container according to claim 1, wherein the step of shrinking the capped container creates a positive pressure within the capped container.

4. The method of forming a plastic container according to claim 1, wherein the end product is heated to a temperature in the range of 70° to 120° F.

5. The method of forming a plastic container according to claim 4, wherein the preform is heated to a temperature in the range of 90° to 150° C.

6. The method of forming a plastic container according to claim 5, wherein the mold is heated to a temperature in the range of 70° to 300° F.

7. The method of forming a plastic container according to claim 1, wherein the end product is heated to a temperature in the range of 185 to 205° F.

8. The method of forming a plastic container according to claim 7, wherein the preform is heated to a temperature in the range of 90 to 150° C.

9. The method of forming a plastic container according to claim 8, wherein the mold is heated to a temperature in the range of 70° to 300° F.

10. The method of forming a plastic container according to claim 1, wherein the preform has a weight in the range of 7 to 32 g.

11. The method of forming a plastic container according to claim 1, wherein the crystallinity of the resultant container is less than 25%.

12. The method of forming a plastic container according to claim 1, wherein the step of shrinking the resultant container shrinks the resultant container in an amount up to 4%.

13. The method of forming a plastic container according to claim 1, wherein the end product is one of water and a hot-fill liquid.

14. A method of forming a plastic container, the method comprising the steps of:
providing a plastic preform;
heating the preform;
locating the preform within a mold, the mold having cavity surfaces defining a cavity shape generally corresponding to a desired shape of the container;
heating an end product to an elevated temperature, the elevated temperature being above ambient temperature;
introducing the heated end product into the heated preform to at least partially cause the heated preformed to expand into contact with the cavity surfaces and to conform with the shape of the cavity, thereby forming a resultant container filled with the heated end product, the resultant container having a first size;
removing the resultant container filled with the heated end product from within the mold;
capping the resultant container with the heated end product therein to form a capped container;
shrinking the capped container to a second size, the second size being smaller than the first size; and
shrinking the end product simultaneously with the step of shrinking the capped container, the shrinking of the end product being at a rate less than the shrinking of the capped container.

15. The method of forming a plastic container according to claim 14, wherein the shrinking of the capped container is a shrinking of volume of the capped container and the shrinking of the end product is a shrinking of volume of the end product.

16. The method of forming a plastic container according to claim 15, wherein the shrinking of the volume of the end product is less than the shrinking of the volume of the capped container.

17. The method of forming a plastic container according to claim 15, wherein the shrinking of the volume of the end product is at a rate less than the shrinking of the volume of the capped container.

18. A method of forming a plastic container, the method comprising the steps of:
providing a plastic preform;
heating the preform;
locating the preform within a mold, the mold having cavity surfaces defining a cavity shape generally corresponding to a desired shape of the container;
heating an end product to an elevated temperature, the elevated temperature being above ambient temperature;
introducing the heated end product into the heated preform to at least partially cause the heated preformed to expand into contact with the cavity surfaces and to conform with the shape of the cavity, thereby forming a resultant container filled with the heated end product, the resultant container having a first size;
removing the resultant container filled with the heated end product from within the mold;
capping the resultant container with the heated end product therein to form a capped container;
shrinking the capped container to a second size, the second size being smaller than the first size; and
maintaining the crystallinity of the resultant container below 25% during formation of the resultant container.

19. The method of forming a plastic container according to claim 18, wherein the step of maintaining the crystallinity of the resultant container below 25% includes the step of introducing the heated end product into the preform.

\* \* \* \* \*